(12) United States Patent
Chen et al.

(10) Patent No.: US 10,901,568 B2
(45) Date of Patent: Jan. 26, 2021

(54) METHOD AND APPARATUS FOR RECOMMENDING A SOLUTION BASED ON A USER OPERATION BEHAVIOR

(71) Applicant: BAIDU ONLINE NETWORK TECHNOLOGY (BEIJING) CO., LTD., Beijing (CN)

(72) Inventors: Bo Chen, Beijing (CN); Xinmin Wang, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 231 days.

(21) Appl. No.: 15/301,330

(22) PCT Filed: Aug. 26, 2015

(86) PCT No.: PCT/CN2015/088188
§ 371 (c)(1),
(2) Date: Sep. 30, 2016

(87) PCT Pub. No.: WO2016/110114
PCT Pub. Date: Jul. 14, 2016

(65) Prior Publication Data
US 2017/0024228 A1    Jan. 26, 2017

(30) Foreign Application Priority Data
Jan. 9, 2015    (CN) .......................... 2015 1 0012093

(51) Int. Cl.
*G06F 9/44*    (2018.01)
*G06F 3/0481*    (2013.01)
(Continued)

(52) U.S. Cl.
CPC .......... *G06F 3/0481* (2013.01); *G06F 3/0484* (2013.01); *G06F 9/453* (2018.02)

(58) Field of Classification Search
CPC ............................ G06F 3/0481; G06F 9/4446
See application file for complete search history.

(56) References Cited

U.S. PATENT DOCUMENTS 4,500,964 A     2/1985  Nickle
6,487,713 B1*  11/2002  Cohen ....................... G06F 8/34
                                                              717/105

(Continued)

FOREIGN PATENT DOCUMENTS

CN    101662387 A    3/2010
CN    101676909 A    3/2010

(Continued)

OTHER PUBLICATIONS

Mshiyas, "How to Delete a File or Folder Showing Error "Access Is Denied"", Available: Jun. 23, 2012, https://web.archive.org/web/20120623081230/https://mshiyas.wordpress.com/how-to-delete-a-file-or-folder-showing-error-access-is-denied/ (Year: 2012).*

(Continued)

*Primary Examiner* — Seth A Silverman
(74) *Attorney, Agent, or Firm* — Nixon Peabody LLP

(57) ABSTRACT

A method and apparatus for recommending a solution based on a user operation behavior includes: monitoring a second window object triggered after a user operates a first window object; if the second window object is an abnormal window, determining a type of the abnormal window by extracting textual information in the second window object; recommending a solution to a problem corresponding to the second window object according to the type of the abnormal window and the monitored operation behavior of the user to the second window object. The method provides the corresponding solution to the user when it can be analyzed that the user needs to obtain a solution to the corresponding problem according to the user's operation behavior, which exempts the user from manually searching a solution.

11 Claims, 3 Drawing Sheets

(51) Int. Cl.
  *G06F 3/0484*  (2013.01)
  *G06F 9/451*  (2018.01)

(56) References Cited

U.S. PATENT DOCUMENTS

| | | | |
|---|---|---|---|
| 6,573,906 B1 | 6/2003 | Harding | |
| 2004/0199828 A1* | 10/2004 | Cabezas | G06F 11/0748 |
| | | | 714/39 |
| 2007/0198001 A1* | 8/2007 | Bauch | G06F 19/3418 |
| | | | 606/1 |
| 2011/0283226 A1 | 11/2011 | Basson et al. | |

FOREIGN PATENT DOCUMENTS

| | | |
|---|---|---|
| CN | 102236587 A | 11/2011 |
| CN | 103051516 A | 4/2013 |
| CN | 103684826 | 3/2014 |
| CN | 104216997 A | 12/2014 |
| CN | 104598128 A | 5/2015 |
| JP | 2009282817 A1 | 12/2009 |
| JP | 2011-145918 A | 7/2011 |

OTHER PUBLICATIONS

International Search Report for PCT/CN2015/088188 dated Dec. 2, 2015, 2 pages.
First Office Action for Chinese Application No. 201510012093.4 dated Mar. 31, 2017, 18 pages.

\* cited by examiner

METHOD AND APPARATUS FOR RECOMMENDING A SOLUTION BASED ON A USER OPERATION BEHAVIOR

CROSS-REFERENCE OF RELATED APPLICATION

This present application is a U.S. national stage under 35 U.S.C. § 371 of International Application No. PCT/CN2015/088188, filed on Aug. 26, 2015, which claims a priority right of Chinese patent application No. 201510012093.4 filed on Jan. 9, 2015. Each of the above-referenced applications is incorporated herein by reference to their entireties.

TECHNICAL FIELD

The present application relates to a computer technology, and more specifically relates to a method and apparatus for recommending a solution based on a user operation behavior.

BACKGROUND

When using a computer, if a user has a problem that cannot be easily tackled, e.g., failure to delete a file, failure to end a process, lack of a dll (dynamic link library) file, or running of the operating system gets stuck, etc., and if the user is unfamiliar with computer operations, an approach that can help him/her to solve the problems would be urgently needed.

Currently, computers usually provide solutions to problems which users encounter when operating the computers by embedding a help file in the operating system. However, the help file only contains solutions to problems occurring to the operating system and to software built in the operating system, while problems occurring to third party software or unknown problems occurring to the operating system cannot be solved. Therefore, is the aforementioned art cannot provide user-friendly services combining actual problems of the user and solutions to the problems.

SUMMARY

One of the technical problems to be solved by certain embodiments of the present application is to provide a solution according to an actual problem of a user when using a computer so as to provide a user-friendly service.

According to one embodiment of an aspect of the present application, there is provided a method of recommending a solution based on a user operation behavior, comprising:

monitoring a second window object triggered after a user operates a first window object;

if the second window object is an abnormal window, determining a type of the abnormal window by extracting textual information in the second window object;

recommending a solution to a problem corresponding to the second window object according to the type of the abnormal window and the monitored operation behavior of the user to the second window object.

According to one embodiment of another aspect of the present application, there is provided an apparatus of recommending a solution based on a user operation behavior, comprising:

a module configured to monitor a second window object triggered after a user operates a first window object;

a module configured to, if the second window object is an abnormal window, determine a type of the abnormal window by extracting textual information in the second window object;

a module configured to recommend a solution to a problem corresponding to the second window object according to the type of the abnormal window and the monitored operation behavior of the user to the second window object. Because the present embodiment may determine, when monitoring that a second window object that is triggered after the user operates the first window is an abnormal window, a corresponding solution by identifying a type of the second window object, and when it is analyzed according to a user's operation behavior that the user needs to obtain a solution for solving a corresponding problem, provide the corresponding solution to the user, which exempts the user form a need of manually searching the solution and implements a user-friendly smart recommendation function, such that it effectively helps the user to solve various problems occurring during a procedure of using the computer and promotes use experience of the user.

A person of normal skill in the art will appreciate that although the detailed depiction below will be carried out with reference to the embodiments and drawings, the present application is not limited to these embodiments. Instead, the scope of the present application is intended to be limited only by the appended claims.

BRIEF DESCRIPTION OF THE ACCOMPANYING DRAWINGS

Other features, objectives, and advantages of the present application will become more apparent by reading the detailed depiction of the non-limiting embodiments with reference to the accompanying drawings.

Same or similar reference numerals in the accompanying drawings represent same or similar components.

DETAILED DESCRIPTION OF THE PREFERRED EMBODIMENTS

Figure 1:
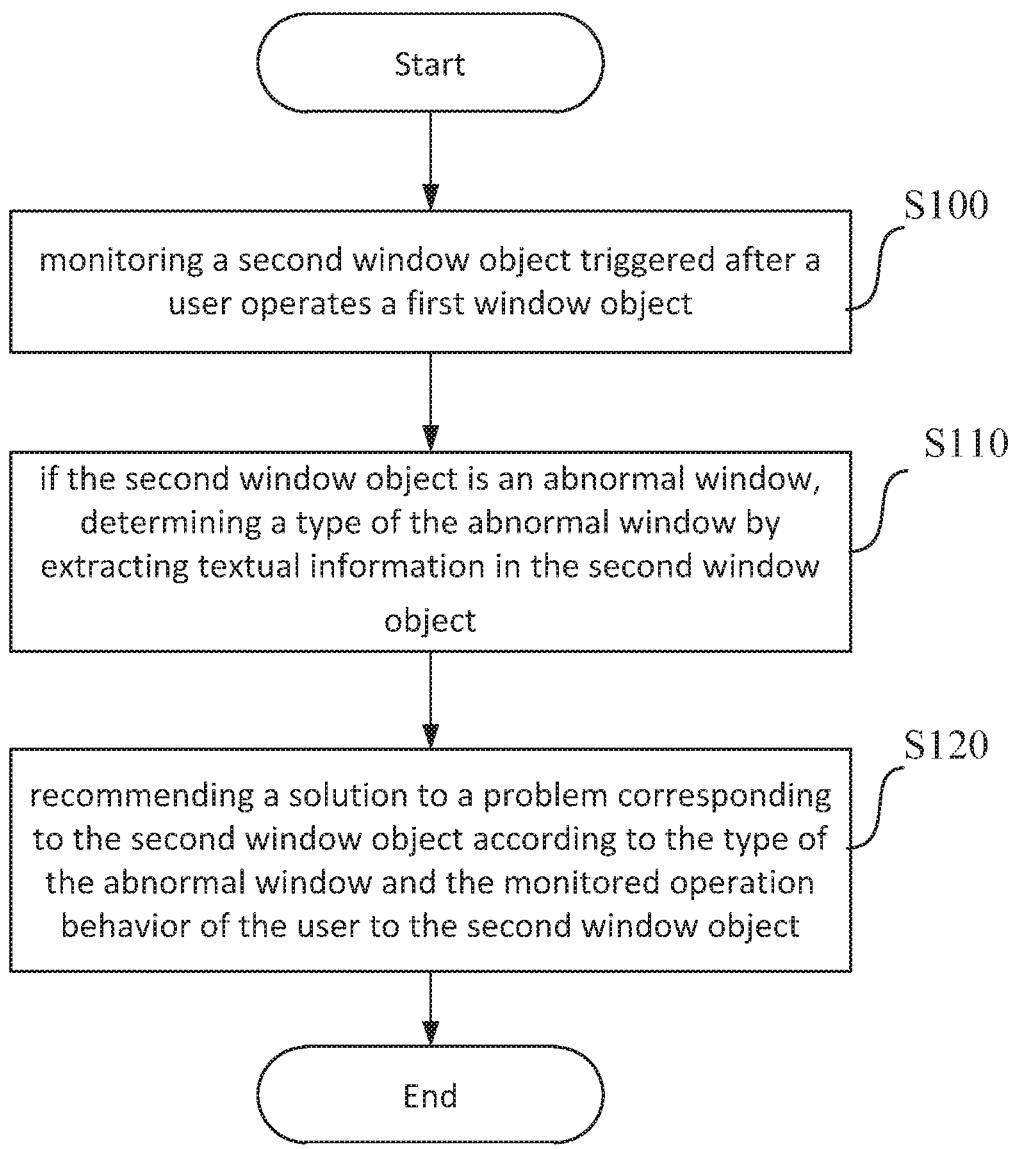
FIG. 1 illustrates a flow diagram of a method for recommending a solution based on a user operation behavior according to one embodiment of the present application.

Before discussing the exemplary embodiments in more detail, it should be mentioned that some exemplary embodiments are described as a process or method depicted as a flow diagram. Although the flow diagram describes various operations to be processed sequentially, many operations therein may be carried out in parallel, concurrently or simultaneously. Besides, sequences of various operations may be re-arranged. When their operations are completed, the process may be terminated. However, there may also comprise additional steps in the drawings. The process may correspond to a method, function, specification, sub-routine, sub-program, etc.

The "computer device" herein, also referred to as "computer," refers to a smart electronic device that may perform a predetermined processing procedure such as numerical calculation and/or logical calculation by running a predetermined program or instruction, which may comprise a processor and a memory, such that the predetermined processing process is executed by executing a pre-stored program instruction in the memory by the processor, or the predetermined processing process is implemented by hardware such as ASIC, FPGA, DSP, or the predetermined processing process is implemented by a combination thereof. The computer device includes, but not limited to, a server, a personal computer, a laptop, a tablet computer, and a smart phone, etc.

Hereinafter, the present application will be described in more detail with reference to the accompanying drawings.

FIG. 1 illustrates a flow diagram of a method for recommending a solution based on a user operation behavior according to one embodiment of the present application.

As illustrated in FIG. 1, the method of recommending a solution based on a user operation behavior according to the present embodiment comprises steps of:

S100. monitoring a second window object triggered after a user operates a first window object;

S110. if the second window object is an abnormal window, determining a type of the abnormal window by extracting textual information in the second window object;

S120. recommending a solution to a problem corresponding to the second window object according to the type of the abnormal window and the monitored operation behavior of the user to the second window object.

Hereinafter, respective steps may be introduced in further detail.

In step S100, the computer device may create an event notification callback function and a mouse-keyboard global hook of the operating system based on a message processing mechanism of the operating system; in the event notification callback function, other create events than creating a window object are filtered, and meanwhile trigger of a message of creating a window object is monitored.

Wherein, the event notification callback function is a function invoked by a function pointer. The function pointer may be one or plural. Each pointer is directed to a specific event. When the specific event occurs, the pointer invokes a corresponding function to trigger a corresponding operation. The mouse-keyboard global hook is for obtaining an operation behavior with respect to the created event through a mouse and keyboard, and then determining whether the user has solved a problem to occur or has not solved the problem to occur through the user's operation behavior.

In the present embodiment, the computer device monitors an event message using an event notification callback function; after a message that the created event is a window object is triggered, i.e., the first window object is created, the user's operation behavior is further obtained through the mouse keyboard global hook. If a second window object is further triggered after the user operates the first window object through the mouse or keyboard, it indicates that the user's operation on the first window object might meet a problem that cannot be tackled. If the second window object is not triggered after the user operates the first window object, it indicates that a corresponding task has been completed by the user's operation on the first window object, without a need of recommending a solution.

In step S110, when monitoring that the user's operation on the first window object has triggered the second window object, the computer device first determines a type of the second window object, because only when the type of the second window object belongs to an abnormal prompt or an alarm window (hereinafter referred to as an abnormal window), will it further indicate that the user's operation on the first window object has met a problem that cannot be tackled.

Wherein, alternatively, the computer device may adopt the following method to determine a type of the second window object:

obtaining all textual information distributed on the second window object by enumerating window sub-controllers;

determining a type of the abnormal window by identifying the textual information.

Optionally, in the present embodiment, the computer device may first discern different scenarios through the textual information described by the obtained second window object, then continue to obtain environment information in the specific scene, and then obtain all textual information distributed on the second window object based on the environment information, and determine the type of the abnormal window by identifying the textual information. Specifically, the computer device may obtain the environment information in a specific scene through the following steps:

obtaining a parent window handle and a parent window handle of a parent window through a handle of the current window object;

then enumerating all objects under all parent windows and titles of all objects under a same parent window as the parent window, as well as other feature information, so as to obtain environment information associated with the current scene.

Afterwards, the computer device may obtain all textual information distributed on the second window object using the obtained environment information associated with the current scene.

Wherein, the handle is to identify different objects in an application and different instances of a same kind of objects using a unique integer value, e.g., a window, a button, an icon, a scrollbar, a control or a file, etc.; by analyzing the handle, the computer device can split a window object into a plurality of instances and identify the instances with literal contents; the identified textual content may act as textual information on the second window object, and then it may be obtained whether it is an abnormal window and a type of the abnormal window.

In step S120, after confirming that the second window object is an abnormal window as well as the type of the abnormal window, the computer device continues to monitor the user's operation behavior through a global mouse-keyboard hook.

For example, if the user performs a retry operation to the second window object for at least once and triggers at least one second window object, or continues to trigger the second window object after re-triggering the first window object upon closing of the second window object (destroying the second window object), it indicates that the user cannot solve the current problem and it is needed to provide a solution to the current problem.

In this case, the computer device may determine a corresponding solution from the pre-stored solution library as a solution for solving the problem corresponding to the second window object according to a type of the abnormal window, and then provides the determined solution to the user. Alternatively, the computer device may provide the determined solution according to the following manner to the user:

when the user performs a retry operation to the second window object, popping up the solution to the abnormal window at a position covering the second window; or when the user performs a close operation to the second window object, popping up the solution to the abnormal window at a specific position of the currently displayed screen.

Figure 2:
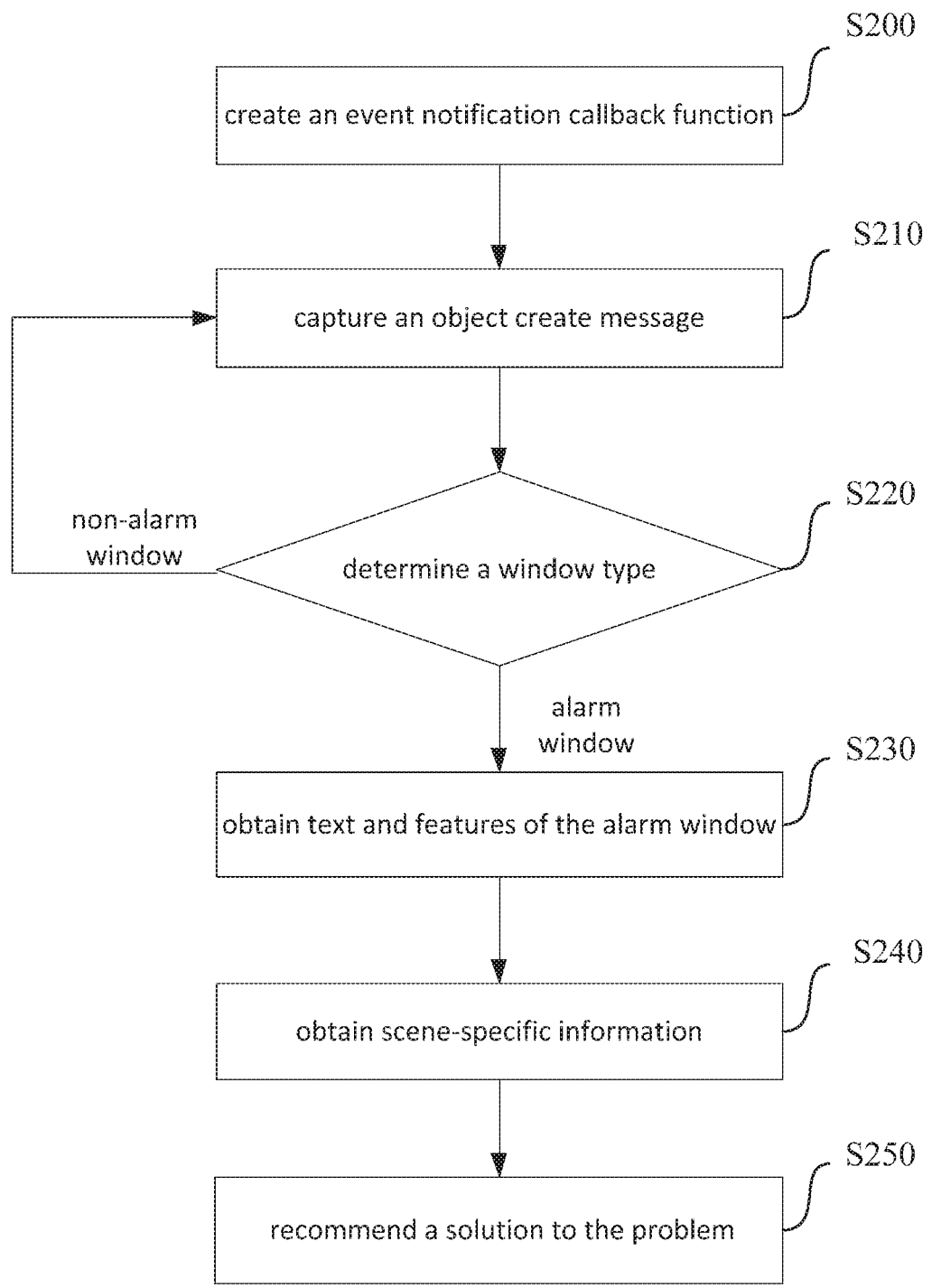
FIG. 2 illustrates a flow diagram of a method for recommending a solution based on a user operation behavior according to another embodiment of the present application.

Hereinafter, the method of recommending a solution based on a user operation behavior provided by the present application will be described in detail through specific embodiments. The present embodiment will be illustrated with the Windows operating system as an example. As shown in FIG. 2, the method comprises:

In step S200, the computer device creates an event notification callback function. Specifically, the computer device may be used to monitor the window object created in the Windows 7 operating system through the event callback function.

In the present embodiment, illustration will be made with a Delete File popup prompt window as a specific window object, which is only exemplary. Those skilled in the art should understand that methods of recommending other solutions to problems such as failure of terminating a process, lack of a dll file, and that the operating system gets stuck during running, should also fall into the protection scope of the present application. For the sake of clarity, they are only incorporated here by reference and will not be detailed.

In step S210, the computer device captures an object create message. Specifically, when monitoring a message that a Delete File popup prompt window is created, the computer device captures the message.

In the Windows operating system, the type of the Delete File popup prompt window is #32770. When monitoring a create event that the window object type is #32770, the title of the window object is obtained through an event notification callback function and it is judged whether the capture is "Delete File." If yes, the window object is a Delete File confirmation prompt window triggered by the user's deleting a file; otherwise, it is other type of popup window.

In step S220, the computer device determines a window type. When the user selects "Confirm" in the Delete File popup prompt window, the computer device enters into a Delete File scene. In the Delete File scene, the computer device determines the window type based on title of the window, a text, and a current focal text. In the Delete File scene, a Delete File Failure alarm window may comprise textual contents such as "unable to delete the file," "unable to delete the folder," "the file is being used," "the folder is being used," and other contents. The computer device may determine a window type based on the text above. If the window type is an alarm window, perform step 230; if the window type is a non-alarm window, perform step 210. By determining the window type, the computer device may filter off the non-alarm windows such as "delete a file" and "privilege escalation" so as to accurately capture the Delete File Failure alarm window.

In step S230, the computer device obtains a text and feature of the alarm window. When the Delete File Failure alarm window is triggered, in conjunction with a focal setting event, mouse and keyboard and like messages before the previous "Delete File" Confirm prompt window popup, the computer device obtains one or more filename lists as deleted.

In step S240, the computer device obtains specific scene information. Specifically, the computer device finds an edit box control object with a path where the current file is located by enumerating windows to obtain the file path. Finally, the filename list and file path are combined into a complete scene of failing to delete a certain file.

In step S250, the computer device recommends a solution to the problem. A solution library stores a solution for each type of alarm windows, while for the alarm window "unable to delete a file," a file shredder is used. The computer device determines that the user performs a retry or cancel operation on the "Unable to Delete File" alarm window through a message from a mouse and keyboard and an object destroy event. Wherein, the computer device determines trigger of a same-path same-name delete failure event to be a retry operation, while determines trigger of a same-window handle object destroy event as a cancel operation. If the computer determines a retry operation according to a user operation, a system window overlaying the current window is popped up to strongly recommend the user to use a file shredder; if it is determined to be a cancel or close operation, a manner of popping up a window at the lower-right corner is used to prompt the user whether he/she needs a file shredder.

When monitoring that a second window object triggered by the user after operating the first window object is an abnormal window, the method of recommending a solution based on a user operation behavior according to the present embodiment determines a corresponding solution by identifying the type of the second window object, and provides the corresponding solution to the user when analyzing that the user needs to obtain a solution to the corresponding problem according to the user's operation behavior, which exempts the user from manually searching a solution; more importantly, it only recommends a solution to the user when the user cannot solve the corresponding solution, rather than recommending solutions to the user for every problem he/she meets, thereby implementing a user-friendly smart recommendation function, which can effectively help the user to solve various problems occurring during the procedure of using computers, thereby enhancing user experience.

Figure 3:
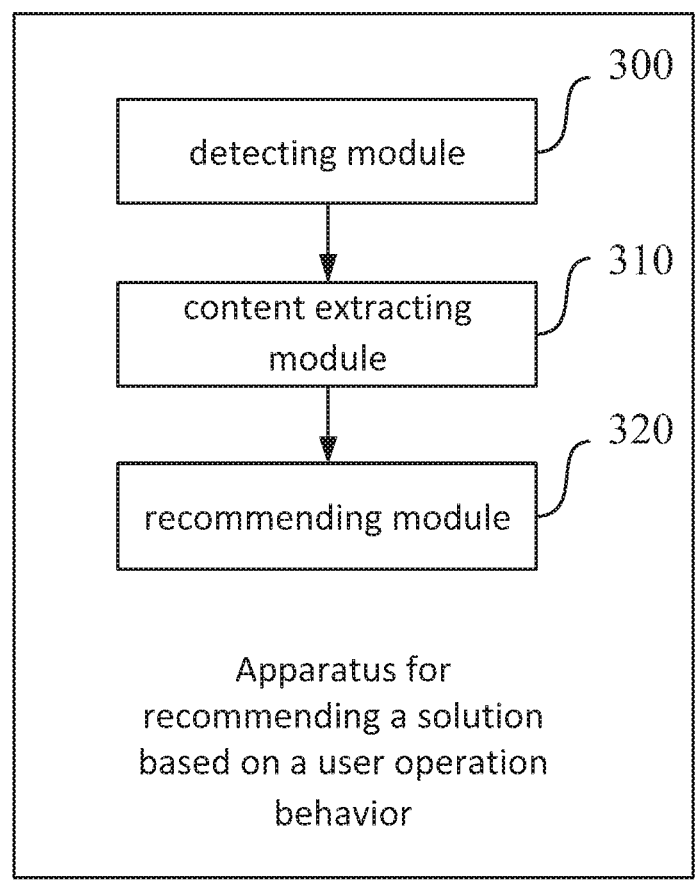
FIG. 3 illustrates a block diagram of an apparatus for recommending a solution based on a user operation behavior according to one embodiment of the present application.

FIG. 3 illustrates a block diagram of an apparatus for recommending a solution based on a user operation behavior according to one embodiment of the present application (hereinafter referred to as "solution recommending apparatus"). The solution recommending apparatus may be a computer device or an apparatus in a computer device. As illustrated in FIG. 3, the solution recommending apparatus comprises:

a module 300 (hereinafter referred to as "a monitoring unit") configured to monitor a second window object triggered after a user operates a first window object;

a module 310 (hereinafter referred to as "a content extracting unit") configured to, if the second window object is an abnormal window, determine a type of the abnormal window by extracting textual information in the second window object;

a module 320 (hereinafter referred to as "a recommending unit") configured to recommend a solution to a problem corresponding to the second window object according to the type of the abnormal window and the monitored operation behavior of the user to the second window object.

The monitoring unit 300 may create an event notification callback function and a mouse-keyboard global hook of the operating system based on a message processing mechanism of an operating system; in the event notification callback function, other create events besides creating a window object are filtered, meanwhile trigger of a message of creating a window object is monitored.

Wherein, the event notification callback function is a function invoked by a function pointer. The function pointer may be one or plural. Each pointer is directed to a specific event. When the specific event occurs, the pointer invokes a corresponding function to trigger a corresponding operation. The mouse-keyboard global hook is for obtaining an operation behavior with respect to the created event through a mouse and keyboard, and then determining whether the user has solved a problem to occur or has not solved the problem to occur through the user's operation behavior.

In the present embodiment, the monitoring unit 300 monitors an event message using an event notification callback function; after a message that the created event is a window object is triggered, i.e., the first window object is created, the user's operation behavior is further obtained through the mouse keyboard global hook. If a second window object is further triggered after the user operates the first window object through the mouse or keyboard, it indicates that the user's operation on the first window object might meet a problem that cannot be tackled. If the second window object is not triggered after the user operates the first window object, it indicates that a corresponding task has been completed by the user's operation on the first window object, without a need of recommending a solution.

The content extracting unit 310, when monitoring that the user's operation on the first window object has triggered the second window object, first determines a type of the second window object, because only when the type of the second window object belongs to an abnormal prompt or an alarm window (hereinafter referred to as an abnormal window), will it further indicate that the user's operation on the first window object has met a problem that cannot be tackled.

Wherein, alternatively, the content extracting unit 310 may adopt the following modules to determine a type of the second window object:

a sub-module (hereinafter referred to as "information obtaining unit") configured to obtain all textual information distributed on the second window object by enumerating window sub-controllers;

a sub-module (hereinafter referred to as "type identifying unit") configured to determine a type of the abnormal window by identifying the textual information.

Optionally, in the present embodiment, the information obtaining unit may first discern different scenarios through the textual information described by the obtained second window object, then continue to obtain environment information in the specific scene, and then obtain all textual information distributed on the second window object based on the environment information, and determine the type of the abnormal window by identifying the textual information. Specifically, the information obtaining unit may obtain the environment information in a specific scene through the following units:

a unit for obtaining a parent window handle and a parent window handle of a parent window through a handle of the current window object;

a unit for enumerating all objects under all parent windows and titles of all objects under a same parent window as the parent window, as well as other feature information, so as to obtain environment information associated with the current scene.

Afterwards, the information obtaining unit may obtain all textual information distributed on the second window object using the obtained environment information associated with the current scene.

Wherein, the handle is to identify different objects in an application and different instances of a same kind of objects using a unique integer value, e.g., a window, a button, an icon, a scrollbar, a control or a file, etc.; by analyzing the handle, the type identifying unit can split a window object into a plurality of instances and identify the instances with textual content; the identified textual content may act as textual information on the second window object, and then it may be obtained whether it is an abnormal window and a type of the abnormal window.

After confirming that the second window object is an abnormal window as well as the type of the abnormal window, the recommending unit 320 continues to monitor the user's operation behavior through a global mouse-keyboard hook.

After the recommending unit 320 confirms that the second window object is the type of abnormal window, a corresponding solution may be determined through the following sub-modules:

a sub-module configured to determine, according to the type of the abnormal window, a corresponding solution from the pre-stored solution library as the solution to the problem corresponding to the second window.

For example, if the user performs a retry operation to the second window object for at least once and triggers at least one second window object, or continues to trigger the second window object after re-triggering the first window object upon closing of the second window object (destroying the second window object), it indicates that the user cannot solve the current problem and it is needed to provide a solution to the current problem.

In this case, the recommending unit 320 may determine a corresponding solution from the pre-stored solution library as a solution for solving the problem corresponding to the second window object according to a type of the abnormal window, and then provides the determined solution to the user through the following sub-modules:

a sub-module configured to, when the user performs a retry operation to the second window object, pop up the solution to the abnormal window at a position covering the second window; or a sub-module configured to, when the user performs a close operation to the second window object, pop up the solution to the abnormal window at a specific position of the currently displayed screen.

Hereinafter, the method of recommending a solution based on a user operation behavior provided by the present application will be described in detail through specific embodiments. The present embodiment will be illustrated with the Windows operating system as an example. As shown in FIG. 2, the method comprises:

In step S200, the computer device creates an event notification callback function. Specifically, the computer device may be used to monitor the window object created in the Windows 7 operating system through the event callback function.

In the present embodiment, illustration will be made with a Delete File popup prompt window as a specific window object, which is only exemplary. Those skilled in the art should understand that methods of recommending other solutions to problems such as failure of terminating a process, lack of a dll file, and that the operating system gets stuck during running, should also fall into the protection scope of the present application. For the sake of clarity, they are only incorporated here by reference and will not be detailed.

In step S210, the monitoring unit 300 captures an object create message. Specifically, when monitoring a message that a Delete File popup prompt window is created, the monitoring unit 300 captures the message.

In the Windows operating system, the type of the Delete File popup prompt window is #32770. When monitoring a create event that the window object type is #32770, the title of the window object is obtained through an event notification callback function and it is judged whether the capture is "Delete File." If yes, the window object is a Delete File confirmation prompt window triggered by the user's deleting a file; otherwise, it is other type of popup window.

In step S220, the content extracting unit determines a window type. Specifically, when the user selects "Confirm" in the Delete File popup prompt window, a Delete File scene appears. In the Delete File scene, the content extracting unit 310 determines the window type based on title of the window, a text, and a current focal text. In the Delete File scene, a Delete File Failure alarm window may comprise textual contents such as "unable to delete the file," "unable to delete the folder," "the file is being used," "the folder is being used," and other contents. The content extracting unit 310 may determine a window type based on the text above. If the window type is an alarm window, perform step 230; if the window type is a non-alarm window, perform step 210. By determining the window type, the computer device may filter off the non-alarm windows such as "delete a file" and "privilege escalation" so as to accurately capture the Delete File Failure alarm window.

In step S230, the content extracting unit 310 obtains a text and feature of the alarm window. Specifically, when the Delete File Failure alarm window is triggered, in conjunction with a focal setting event, mouse and keyboard and like messages before the previous "Delete File" Confirm prompt window popup, the content extracting unit 310 obtains one or more filename lists as deleted.

In step S240, the content extracting unit 310 obtains specific scene information. Specifically, the content extracting unit 310 finds an edit box control object with a path where the current file is located by enumerating windows to obtain the file path. Finally, the filename list and file path are combined into a complete scene of failing to delete a certain.

In step S250, the recommending unit 320 recommends a solution to the problem. The solution library stores a solution for each type of alarm windows, while for the alarm window "unable to delete a file," a file shredder is used. The computer device determines that the user performs a retry or cancel operation on the "Unable to Delete File" alarm window through a message from a mouse and keyboard and an object destroy event. Wherein, the recommending unit determines trigger of a same-path same-name delete failure event to be a retry operation, while determines trigger of a same-window handle object destroy event as a cancel operation. If the computer determines a retry operation according to a user operation, the recommending unit 320 pops up a system window overlaying the current window to strongly recommend the user to use a file shredder; if it is determined to be a cancel or close operation, the recommending unit 320 uses a manner of pop up window at the lower-right corner to prompt the user whether he/she needs a file shredder.

When monitoring that a second window object triggered by the user after operating the first window object is an abnormal window, the apparatus for recommending a solution based on a user operation behavior according to the present embodiment determines a corresponding solution by identifying the type of the second window object, and provides the corresponding solution to the user when analyzing that the user needs to obtain a solution to the corresponding problem according to the user's operation behavior, which exempts the user from manually searching a solution; more importantly, it only recommends a solution to the user when the user cannot solve the corresponding solution, rather than recommending solutions to the user for every problem he/she meets, thereby implementing a user-friendly smart recommendation function, which can effectively help the user to solve various problems occurring during the procedure of using computers, thereby enhancing user experience.

It should be noted that the present application may be implemented in software and/or a combination of software and hardware. For example, respective modules in the present application may be implemented by ASIC (Application Specific Integrated Circuit) or any other similar hardware device. In one embodiment, the software program of the present application may be executed through the processor to implement the steps or functions as aforesaid. Likewise, a software program (including relevant data structure) of the present application may be stored in a computer readable recording medium, e.g., RAM (random access memory) memory, magnetic or optical driver or a floppy disk, and a similar device. In addition, some steps or functions of the present application may be implemented by hardware, e.g., as a circuit cooperating with the processor to execute various steps or functions.

In addition, part of the present application may be applied as a computer program product, e.g., a computer program instruction, which, when being executed by a computer, may invoke or provide a method and/or technical solution according to the present application through operation of the computer. The program instruction that invokes a method of the present application may be stored in a fixed or mobile recording medium, and/or transmitted through broadcast and/or other signal carrier medium, and/or stored in a work memory running according to the program instruction in a computer device. Here, one embodiment according to the present application comprises an apparatus that includes a memory for storing computer program instructions and a processor for executing program instructions, wherein when being executed by the processor, the computer program instruction triggers the apparatus to carry out the methods and/or technical solutions according to various embodiments of the present application.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

What is claimed is:

1. A computer-implemented method of recommending a solution based on a user operation behavior, comprising:
   monitoring a second window object triggered after a user operates a first window object;

in response to the second window object not being an abnormal window, continuing the monitoring;

in response to the second window object being an abnormal window, the abnormal window comprising at least one of a prompting window or an alarming window, performing following operations:

determining a type of the abnormal window by extracting all textual information distributed on the second window object, wherein the extracting all textual information distributed on the second window object comprises:

obtaining a first handle of a first parent window and a second handle of a second parent window, the second parent window being a parent window of the first parent window, based on a handle of the abnormal window; and enumerating all objects under the first and second parent windows and titles of all objects under the second parent window, as well as other feature information, so as to collect environment information associated with a current scene; and recommending to the user a solution to a problem corresponding to the second window object based on the determined type of the abnormal window and the monitored operation behavior of the user on the second window object, the monitored operation behavior of the user to the second window object comprising a retry operation or a close operation.

2. The method according to claim 1, the recommending a solution to a problem corresponding to the second window object comprises:

when the user performs a retry operation to the second window object, popping up a solution to the abnormal window at a position overlaying the second window; or when the user performs a close operation to the second window object, popping up a solution to the abnormal window at a specific position of the current display screen.

3. The method according to claim 1, wherein a procedure of determining the solution to a problem corresponding to the second window comprises:

determining a corresponding solution from a pre-stored solution library as a solution to the problem corresponding to the second window object according to the type of the abnormal window.

4. A non-transitory computer readable medium that comprises computer code which, when being executed, causes the method according to claim 1 to be executed.

5. A computer device, comprising a memory and a processor, the memory storing computer code, the processor being configured to execute a method according to claim 1 by executing the computer code.

6. The method according to claim 1, wherein the determining a type of the abnormal window by extracting all textual information in the second window object comprises:

obtaining all textual information distributed on the second window object by enumerating window sub-controls; and determining a type of the abnormal window by identifying the textual information.

7. The method according to claim 1, wherein the recommending a solution to a problem corresponding to the second window object based on the type of the abnormal window and the monitored operation behavior of the user to the second window object, comprises:

recommending the solution to the user in response to at least one second window object being triggered by a retry operation on the second window object or in response to the second window object being continuously triggered by re-triggering the first window object after the second window object is closed.

8. The method according to claim 1, wherein the determined type of the abnormal window comprises at least one of: unable to delete a file, failure of terminating a process, lack of a dynamic link library (dll) file, or the operating system getting stuck during running.

9. An apparatus of recommending a solution based on a user operation behavior, comprising:

at least one processor; and a memory storing instructions, the instructions when executed by the at least one processor, cause the at least one processor to perform operations, the operations comprising:

monitoring a second window object triggered after a user operates a first window object;

in response to the second window object not being an abnormal window, continuing the monitoring;

in response to the second window object being an abnormal window, the abnormal window comprising at least one of a prompting window or an alarming window, performing following operations:

determining a type of the abnormal window by extracting all textual information distributed on the second window object, wherein the extracting all textual information distributed on the second window object comprises:

obtaining a first handle of a first parent window and a second handle of a second parent window, the second parent window being a parent window of the first parent window, based on a handle of the abnormal window; and enumerating all objects under the first and second parent windows and titles of all objects under the second parent window, as well as other feature information, so as to collect environment information associated with a current scene; and recommending to the user a solution to a problem corresponding to the second window object based on the determined type of the abnormal window and the monitored operation behavior of the user on the second window object, the monitored operation behavior of the user to the second window object comprising a retry operation or a close operation.

10. The apparatus according to claim 9, wherein the recommending a solution to a problem corresponding to the second window object according to the type of the abnormal window and the monitored operation behavior of the user to the second window object comprises:

when the user performs a retry operation to the second window object, popping up a solution to the abnormal window at a position overlaying the second window; or when the user performs a close operation to the second window object, popping up a solution to the abnormal window at a specific position of the current display screen.

11. The apparatus according to claim 9, wherein the recommending a solution to a problem corresponding to the second window object according to the type of the abnormal window and the monitored operation behavior of the user to the second window object comprises:

determining a corresponding solution from a pre-stored solution library as a solution to the problem corresponding to the second window object according to the type of the abnormal window and the monitored operation behavior of the user with respect to the second window object.

\* \* \* \* \*